United States Patent Office 3,438,767
Patented Apr. 15, 1969

3,438,767
RECOVERY OF COPPER VALUES FROM COPPER ORE
Georg Ludvig Busch, Raa, Sweden, assignor to W. R. Grace & Co., New York, N.Y., a corporation of Connecticut
No Drawing. Filed Oct. 9, 1967, Ser. No. 673,976
Claims priority, application Great Britain, Oct. 28, 1966, 48,388/66
Int. Cl. C22b *15/08*
U.S. Cl. 75—117                                6 Claims

ABSTRACT OF THE DISCLOSURE

Copper is recovered from copper bearing ores by first contacting the ore with an aminocarboxylic acid or derivative thereof to produce a solution containing a copper chelate or complex of copper, and subsequently reducing the chelate to obtain copper metal.

---

The present invention relates to the recovery of copper from copper bearing ores, and more specifically to an improved method for obtaining copper values from ores which are contaminated with appreciable quantities of carbonates and phosphates.

Many methods have been disclosed in the prior are for separating copper from its ores. Typically in hydrometallurgical methods the copper ore is leached, usually by means of an acid, and the copper is subsequently recovered from the leaching solution usually by electrolysis. The acid which is most commonly used in leaching copper ores is sulfuric acid, however it is found that its use can have certain disadvantages. For example, when the ore is contaminated with appreciable amounts of alkaline earth metal carbonate and phosphates, large quantities of sulfuric acid are consumed, i.e., neutralized, without useful leaching of the copper occurring.

It is therefore an object of the present invention to provide an improved method for recovering copper from copper bearing ores.

It is a further object of the present invention to provide a particularly economical procedure for leaching copper from copper bearing ores which are contaminated with alkaline earth metal carbonates and/or phosphates.

These and still further objects of the present invention will become readily apparent to one skilled in the prior art from the following detailed description and specific examples.

Broadly, the present invention comprises a method for recovering copper which involves contacting the copper bearing material with a leaching agent consisting of at least one amino carboxylic acid or derivative thereof to produce an extract containing a chelate (or complex) of copper, and subsequently reducing the chelate to obtain copper metal.

More specifically, I have found that copper bearing ores, particularly those copper bearing ores which are contaminated with considerable quantities of earth metal carbonates and/or phosphates, may be effectively processed to obtain a substantially complete recovery of copper therefrom by the following outlined procedure:

(1) Firstly, the copper ore is contacted with an amino carboxylic acid or derivative thereof to produce an extract which comprises an aqueous solution of a copper containing chelate or complex of the aforementioned amino carboxylic acid; and (2) Secondly, reducing the chelate, preferably by hydrogenation or electrolysis to obtain copper metal.

Copper ores which may be treated in accordance with the present invention are ores conventionally mined which contain copper in the form of carbonates, oxides, various basic salts and so forth. Typically, these copper ores contain about 0.5 to about 1.5 percentage by weight of copper metal. It is contemplated that copper ore, either in the form of native ore as it is mined, or in the form of a concentrate which is prepared by flotation procedures may be readily utilized in the present process. These ores, or concentrates thereof, may contain considerable quantities of alkaline earth metal carbonates and/or phosphates which are generally avoided when conventional acid leach processes are used.

The leaching agents utilized in the practice of the present invention may be defined as amino carboxylic acids or derivatives thereof. Typical amino carboxylic acids used include nitrilo triacetic acid (NTA), ethylene diamine tetraacetic acid (EDTA), dihydroxy ethyl amino acetic acid, hydroxy ethyl amino acetic acid, hydroxy ethyl ethylene diamine triacetic acid, dihydroxy ethyl ethylene diamine diacetic acid, diethylene triamine pentaacetic acid (DTPA), and other similar amino carboxylic acids or their salts such as the alkali metals (sodium, potassium, lithium) or ammonium salts. Also, it is contemplated that mixtures of such compounds may be utilized.

The leaching step is preferably carried out by adding finely divided ore (or concentrate) to a solution of the desired amino carboxylic acid or salt thereof. It is also contemplated that an aqueous suspension of the copper ore may be first prepared and the amino carboxylic acids subsequently added thereto. In general it is found that satisfactory results are obtained when the approximate stoichiometric amounts of acid are used which are required to chelate the theoretical amount of copper present in the ore. However, it is found that either a slight excess or deficiency of amino carboxylic acid may be utilized. In general, the ore suspension contains from about 50 to about 100 parts by weight ore per hundred parts by weight water. Due to the fact some amino carboxylic acids are only slightly soluble in water, it is found that the salts thereof which are more soluble are preferably used to form the leaching solution. However, slightly soluble acids may be used, whereupon they are dissolved by addition of an appropriate amount of an alkaline material.

The leaching step generally requires from about 50 to 300 hours depending upon the nature of the ore being treated. This step in the process is conveniently carried out at about room temperature, however it is contemplated that temperatures ranging from about 10 to about 90° C. may be utilized. The leaching solution is preferably maintained at a pH of from about 5 to about 8 depending upon the leaching agent and the ore employed. In this pH range the desired copper complex readily forms, however the carbonate or phosphate impurities which are present do not react to cause dissipation of the leaching materials. The pH may be adjusted within the required range by addition of alkaline materials such as sodium or potassium hydroxide.

Subsequent to completion of the leaching step, the copper chelate bearing solution is separated by means of decantation, filtration or centrifuging. This solution is then subjected to reduction by means of hydrogenation or electrolysis in order to obtain copper metal, and to regenerate the amino carboxylic acid chelating agent used in the leaching process. Subsequent to regeneration, the complexing agent may be conveniently recycled to the leaching step.

During a leaching procedure, it is found that a copper chelate is formed according to the following general reaction, wherein nitrilo triacetic acid (NTA) is used as the chelating agent:

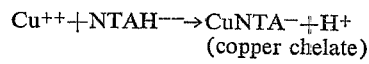
(copper chelate)

The above copper chelate is subsequently reduced either by hydrogenation or by electrolysis. The conditions required for these reductions to take place may be readily determined by one skilled in the art by applying the Nernst formula for chemical electromotive force to the particular reaction involved. In general, when hydrogenation is used as the mode of reduction, super atmospheric pressure on the order of from about 20 to 40 atmospheres of hydrogen are used at elevated temperatures which range from about 100 to 150° C. The reaction below represents the overall reaction which takes place when hydrogenation of the above noted NTA copper chelate is reduced at a pH of from about 7 to about 10.

It is noted in the above reaction, the liberated NTA ion reacts as a buffer for the hydrogen ions produced, but a separate buffer such as a carbonate or phosphate may be used to stalilize the pH further, preventing it from falling too far.

The electrolytic reaction method which may be alternatively carried out to reduce the copper chelate involves feeding the copper chelate solution through an electrolytic cell until substantially all the copper has been recovered. In such electrolytic methods current densities on the order of from about 15 to about 25 ma. per sq. centimeter of cathode area are used. The pH of a complex solution undergoing such electrolytic reduction should generally be maintained in the range of from about 5 to about 10.

The electrolysis apparatus which may be used in the practice of the present invention is conventional in design with a cathode being made of copper and the anode of some inert material such as hard lead or high silicon containing iron. The conditions most suitable for the electrolysis may be readily determined by one skilled in the art and the precise conditions i.e., current densities, voltages, concentrations, may be readily determined by routine experiment.

Having described the basic aspects of the present invention the following examples are given to illustrate embodiments thereof.

Example I

Copper ore from the Timna copper mine in southern Israel and containing about 1.66 percent copper (187.0 g., 0.049 mole Cu) and nitrilo triacetic acid (14.3 g., 0.075 mole) were suspended in water (200 ml.) in a 500 ml. flask which has been fitted with a stirring device. The suspension originally possessed a pH of about 2.5 which was subsequently adjusted to about 6 by addition of 2.5 N sodium hydroxide (44 ml., 0.110 mole) and stirred at 20° C. for 216 hours. The pH of the suspension did not change in view of the fact the ore contained buffering substances, particularly alkaline earth, metal carbonates and phosphates. The suspension was then mixed with Cellite filter aid (5 g.) and filtered over about 4 hours with suction through a paper filter. The filter cake was washed three times with water (70 ml. portions) and the blue colored filtrates were combined and diluted to 400 ml. Aliquot quantities of this stock solution were subsequently subjected to reduction, employing hydrogenation or electrolytical deposition.

Example II

An 80 ml. aliquot of the stock solution obtained from the leaching step in Example I was adjusted to a pH of 9 by adding 2.5 N sodium hydroxide (2.5 ml., 0.0063 mole) and then placed in a 1000 ml. glass lined rocking type autoclave and hydrogenated under 30 atmospheres pressure of hydrogen at 150° C. for 4 hours. At the end of the reaction period the pH had fallen to about 7.

The hydrogenated mixtures contained almost completely deposited finely divided copper powder suspended in an almost colorless liquid. The copper powder was recovered by filtration and washed with water. After drying 0.540 g. copper corresponding to a total amount of 2,700 g. copper in the stock solution was obtained, i.e., 87.0 percent of the copper (3.104 g.) in the ore was recovered in the leaching step. The equivalent amount of NTA originally present in the aliquot was found in the mother liquor subsequent to the filtration step.

Example III

A 50 ml. aliquot of the stock solution obtained in the leaching step of Example I was placed in a platinum beaker comprising the anode of an electrolytic cell and the platinum anode was immersed in the solution. The current was switched on and the sample was electrolysed with a voltage of about 3.0 volts and a current of about 40 ma. The current density was about 0.7 ma./sq. centimeter.

After 4 hours the electrolysis was substantially complete when the current was switched off. The platinum beaker was plated with a layer of light brown copper. After washing and drying, 0.338 g. of 99.8 percent pure copper corresponding to a total amount of 2,704 g. copper in the stock solution was obtained, i.e., 87.1 percent of the copper (3.104 g.) present in the ore was recovered in the leaching step. The equivalent amount of NTA originally present in the aliquot was recovered in the electrolyte after the electrolysis had been completed.

The above examples clearly illustrate that substantial recovery of copper may be obtained from copper bearing ores using the process described herein.

I claim:
1. A method for recovering copper from copper bearing ores which comprises:
    (a) contacting an aqueous suspension of copper bearing ore with an amino carboxylic acid complexing agent to obtain a copper complex containing aqueous extract of said ore;
    (b) separating said copper complex containing extract from said aqueous ore suspension; and
    (c) subjecting said copper complex containing extract to reduction to obtain copper metal and to regenerate said amino carboxylic acid complexing agent.
2. The method of claim 1 wherein hydrogenation is used to reduce said complex.
3. The method of claim 1 wherein electrolysis is used to reduce said complex.
4. The method of claim 1 wherein said contacting step is conducted at a pH of from about 5 to about 8.
5. The metthod of claim 1 wherein said amino carboxylic acid is nitrilo triacetic acid.
6. The method of claim 2 wherein said hydrogenation is conducted under pressure of 10 to 40 atmospheres of hydrogen and at temperatures of 100 to 150° C.

References Cited

UNITED STATES PATENTS 2,168,181  8/1939  Ulrich et al. _____ 252—188
3,163,524  12/1964  Weisberg et al. _____ 75—121

OSCAR R. VERTIZ, *Primary Examiner.*

HOKE S. MILLER, *Assistant Examiner.*

U.S. Cl. X.R.

75—103; 204—1; 252—188